United States Patent [19]

Richards

[11] 4,068,822
[45] Jan. 17, 1978

[54] BALL VALVE

[75] Inventor: Cecil Graham Richards, Aspley, Australia

[73] Assignee: B. C. Richards & Co. Pty. Ltd., Geelung, Australia

[21] Appl. No.: 691,483

[22] Filed: June 1, 1976

[30] Foreign Application Priority Data

May 29, 1975  Australia ............................ 1804/75

[51] Int. Cl.² .............................................. F16K 5/06
[52] U.S. Cl. ............................................... 251/315
[58] Field of Search ......................................... 251/315

[56] References Cited

U.S. PATENT DOCUMENTS

| 2,297,161 | 9/1942 | Newton | 251/315 |
| 2,855,177 | 10/1958 | Freeman | 251/315 X |
| 2,945,666 | 7/1960 | Freeman et al. | 251/315 X |
| 3,288,430 | 11/1966 | Priese | 251/315 |
| 3,717,323 | 2/1973 | Geipel | 251/315 |
| 3,948,480 | 4/1976 | Paptzun et al. | 251/315 |

Primary Examiner—William R. Cline
Attorney, Agent, or Firm—Donald D. Jeffrey

[57] ABSTRACT

In a ball-valve having an apertured rotatable ball and a seal ring contacting the surface of the ball, a radial seal includes a body insert longitudinally movable along a fluid passageway to contact the rear face of the seal ring and a peripheral ring lying partly in an internal annular groove in said passageway and partly in a rebate formed in the seal ring-insert assembly.

The body insert is preferably threaded in said passageway.

2 Claims, 3 Drawing Figures

BALL VALVE

BACKGROUND OF THE INVENTION

This invention relates to ball valves (i.e. valves in which an apertured ball is rotated to open and shut the valve).

Such valves use a seal ring contacting the ball on the upstream and downstream sides, which must seal not only to the ball surface but radially to the valve body surrounding the fluid passageway.

SUMMARY OF THE PRESENT INVENTION

An object of this invention is to provide a seal ring of simple structure giving a positive radial seal to the body.

Another object of the invention is to provide a particularly simple valve structure incorporating this seal.

The invention comprises a ball valve seal assembly including a seal ring contacting the surface of the ball, a body insert longitudinally movable along a fluid passageway in the body of the valve and contacting the rear face of said seal ring, and a peripheral ring lying partly in a rebate formed in said seal ring or said insert and partly in an annular internal groove around said passageway.

A valve using such a seal may include a tubular body and a threaded inlet or outlet to take a connection bearing on the rear of said body insert.

BRIEF DESCRIPTION OF THE DRAWINGS

In order that the invention may be better understood, a particular embodiment will be described with reference to the accompanying drawings, in which.

DETAILED DESCRIPTION OF THE EMBODIMENTS OF THE INVENTION

Figure 1:
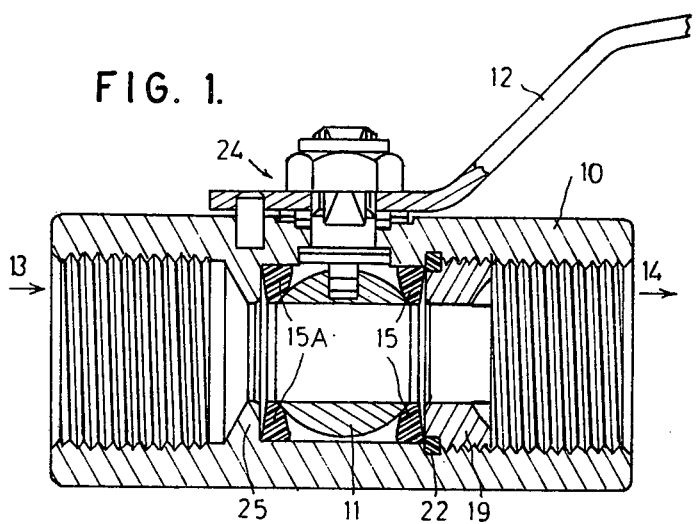
FIG. 1 shows a longitudinal section of a ball valve according to the invention.

Referring first to FIG. 1, valve body 10 is of tubular form, with ball 11 mounted for rotation by a handle 12, body 10 being internally threaded at inlet passage 13 and outlet passage 14.

Figure 2:
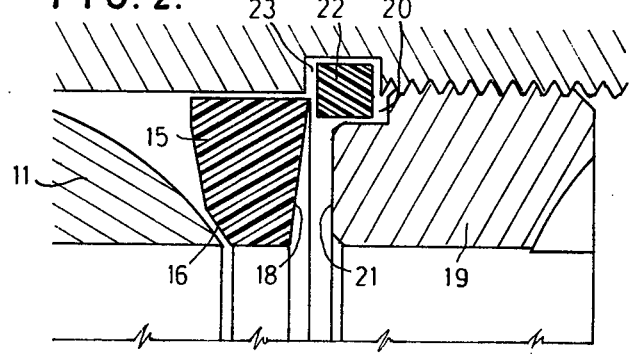
FIG. 2 shows to enlarged scale part of the seal assembly of the valve of FIG. 1.
Figure 3:
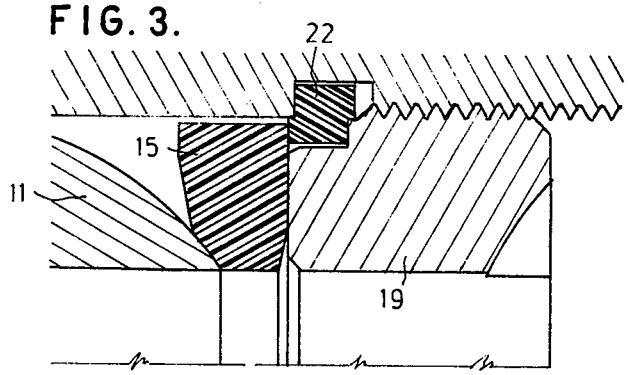
FIG. 3 shows a similar view with the seal under pressure.

Resilient seal rings 15, 15A contact ball 11 on its outlet and inlet sides respectively. The detailed construction of the assembly including seal ring 15 is shown in FIGS. 2 and 3.

Ring 15 has a face 16 sealing to ball 11 about the ball flow orifice.

The rear face 18 of ring 15 is backed by a rigid annular body insert 19 externally threaded to engage the thread of outlet 14. Insert 19 is therefore longitudinally movable in the outlet passage 14. Insert 19 has an external peripheral rebate 20 on its front face 21. A peripheral ring 22 of deformable material lies partly in rebate 20 and partly in an annular internal groove 23 in passage 14.

The rear face 18 of seal ring 15 is preferably dished as 20 shown, so that face 21 of insert 19 exerts pressure mainly towards the outer edge of face 18.

In operation, insert 19 is adjusted from the position shown in FIG. 2, where face 16 does not quite contact ball 11 and ring 22 is loose in groove 23 and rebate 20, to that of FIG. 3 in which seal ring 15 is urged firmly against the ball and the front and rear faces of ring 22 contact the front face of groove 23 and the rear face of rebate 20 respectively.

This provides an effective peripheral seal between the seal ring 15 and body 10.

In FIG. 1, the inlet seal 15A is shown as a normal seal ring backed by a fixed internal flange 25 in inlet 13 without insert 19 or peripheral ring 22. However, an assembly similar to the outlet assembly could clearly be used.

The valve is particularly easy to assemble. Assembly is from the outlet end. The assembly 24 for handle 12 is first fitted into place from inside the fluid passageway and secured; inlet seal ring 15A, ball 11 and seal ring 15 are inserted in order. Ring 22 is then inserted in groove 23. This can be done since ring 22 is made of material flexible enough to be distorted to enable it to be passed along passageway 14 and then expand into groove 23. Finally insert 19 is threaded in and adjusted.

Since ball 11 is not trunnion-mounted, it can move slightly under pressure, and pressure from insert 19 is transmitted via ring 15 and ball 11 to inlet ring 15A to tighten the whole assembly.

The preferred embodiment described has the peripheral ring 22 seated in a rebate 20 in the front face of insert 19. As an alternative, ring 22 may be engaged in a similar rebate in the front radial face of sealing ring 15, its outer part again being in a peripheral groove in passage 14.

What I claim is:

1. A seal assembly in a ball valve, said assembly including: a seal ring contacting the surface of the ball; a body insert longitudinally movable along a fluid passageway in the body of the valve and contacting the rear face of said seal ring to force said seal ring against the ball, said passageway being formed with an annular groove having flat front and rear faces, and said insert including a front contacting surface and being formed with an annular rebate in the contacting surface thereof, said rebate including a flat rear face; and a peripheral ring of deformable material lying partly in said rebate and partly in said annular groove formed in said passageway, said ring having flat front and rear faces, when in an undeformed condition, the front flat face of said peripheral ring when said insert is in an assembled position contacting the front face of said groove and the rear face of said seal ring, and the rear flat face of said peripheral ring contacting the flat rear face of said rebate, thereby to provide solid line contact at both the front and rear flat faces of said ring to provide a peripheral seal between said seal ring and the body of the valve.

2. The seal assembly of claim 1 wherein said rear face of said seal ring is generally dished shape in an outward direction whereby said front contacting surface of said body insert exerts pressure mainly towards the outer edge of said rear face of said ring.

* * * * *